(12) United States Patent
Slater (10) Patent No.: US 7,020,639 B1
(45) Date of Patent: Mar. 28, 2006

(54) CHECK VERIFICATION SYSTEM AND METHOD

(75) Inventor: Alan T. Slater, East Brunswick, NJ (US)

(73) Assignee: Citibank, N.A., New York, NY (US)

( * ) Notice: Subject to any disclaimer, the term of this patent is extended or adjusted under 35 U.S.C. 154(b) by 380 days.

(21) Appl. No.: 09/695,543

(22) Filed: Oct. 24, 2000

Related U.S. Application Data (60) Provisional application No. 60/161,254, filed on Oct. 25, 1999.

(51) Int. Cl.
*G06F 11/60* (2006.01)

(52) U.S. Cl. .............................. 705/75; 705/80; 705/42; 379/93.12

(58) Field of Classification Search .................. 705/80, 705/26, 75, 76, 47, 42, 39, 1; 235/379, 380; 379/93.12

See application file for complete search history.

(56) References Cited

U.S. PATENT DOCUMENTS 6,283,366 B1 * 9/2001 Hills et al. ................... 235/379
6,354,491 B1 * 3/2002 Nichols et al. ............. 235/379

FOREIGN PATENT DOCUMENTS

JP 411272771 A * 10/1999

* cited by examiner

*Primary Examiner*—Elisca Pierre Eddy
(74) *Attorney, Agent, or Firm*—Kramer Levin Naftalis & Frankel LLP (57) ABSTRACT

A method and system for determining the negotiability of checks drawn on any account from any bank or other financial institution based on a comparison against stored information on whether or not checks previously drawn on that account have cleared and were paid includes a database having two related tables. A table of active accounts at any bank is generated by recording account information from checks presented for negotiation at a second bank. If the check is not returned after a predetermined number of days (i.e., the check is paid), the record is updated to show that the account is "in good standing". A separate table of accounts that are not in good standing is generated from returned unpaid checks. For each new entry in the table of accounts that are not in good standing, a corresponding record in the active account table is updated to show a status of "not in good standing". Also, for each entry in the active file that changes its status from "active" to "in good standing", any corresponding entry in the table of accounts that are not in good standing is deleted. Information concerning whether a checking account is in good standing or is not in good standing may be used by the financial institution or by merchants or other third party providers to determine, in real time, if they should accept a check as payment by querying the database so formed.

4 Claims, 4 Drawing Sheets

CHECK VERIFICATION SYSTEM AND METHOD

CROSS-REFERENCE TO RELATED APPLICATIONS

The present application claims the benefit of priority from U.S. application Ser. No. 60/161,254, filed Oct. 25, 1999.

BACKGROUND OF THE INVENTION

The present invention relates generally to a method and system for determining whether a check used as payment for goods and services will likely be paid. More particularly, the invention relates to a system and method for developing a database of checking account information from checks received for processing and for comparing a check presented to a merchant or financial institution against that database to determine whether or not the account is in good standing. The database is populated with information obtained by tracking checks that are negotiated by financial institutions to determine if they are paid or are returned unpaid. The invention allows a financial institution or other business accepting checks to make available data concerning any checking account from any financial institution for which it has attempted to negotiate payment.

Many businesses and consumers pay for goods and services with checks, and many businesses and merchants accept checks for payment. The use of checks provides a significant convenience by making it possible to purchase goods and services or pay bills without having to tender cash for each transaction. However, accepting checks exposes a business or merchant to the risk that the check will be bad, or "bounce", and will not be honored by the payor's bank. This typically occurs in cases where the account on which the check was drawn has insufficient funds, or if the check is a forgery. In most cases where a check is bad, it may be difficult to collect payment from the payor or repossess goods purchased with the bad check.

In light of the potential exposure to losses associated with accepting checks, businesses have sought ways to accurately differentiate between good checks and bad checks. Accuracy is essential because businesses want to reject as many bad checks as possible and limit the number of good checks rejected. Generally, the decision to accept or reject a check must be made prior to completion of the transaction, and must be made quickly while the payor waits.

In order to provide businesses with greater levels of confidence regarding acceptance of checks presented by payors, several companies offer such businesses check verification or guarantee services. With check "verification", a business relies on an authorization received from the check verification company (e.g., in the form of an authorization code) to decide whether to accept or reject the check. However, the business retains the risk of loss if the check turns out to be bad. In most cases, the business is charged a flat fee for each check verification.

With check "guarantee" companies, the company will actually purchase the check from the business if an approved check turns out to be bad. This ensures that the business will not suffer a loss if it accepts a check that has been approved by the check guarantee company. In most cases, the business is charged a discount fee equal to a percentage of the value of each guaranteed check.

These check acceptance (verification and guarantee) companies provide authorization codes in response to transaction data, such as the transit ABA number and account number for the check and the purchase amount, provided by the business. Typically, the acceptance companies will determine the authorization codes by searching a database for negative information, such as outstanding bad checks, associated with the checking account number or identification data (e.g., driver's license number). This data is received from various participating banks and is then analyzed to determine the probability that the current check will be bad.

Even with the prevalent use of check acceptance services, it is estimated that financial institutions and merchants incur losses from bad checks amounting to $13 billion dollars a year. This is largely attributable to the paucity of data available to the acceptance companies.

The ability of the check acceptance companies to collect checking account data is constrained by the number of banks and financial institutions that subscribe to their services and provide their account data as well as the ability of those banks and financial institutions to provide data concerning all of their accounts. For example, many businesses which supply data to acceptance companies limit the data on accounts that are not in good standing. Therefore, both financial institutions and businesses repeatedly incur losses from bad checks written on the same accounts.

In addition, today, there are no databases, of any significant size, that provide information about checking account holders including names and addresses along with bank account numbers. For example, a major printer of checks may attempt to build such a database, but it would require the consent of every bank for whom it prints checks, to use of its data and there is no capability for obtaining information about accounts that get their checks printed privately.

What is desired is a comprehensive database that can provide current information about the status of any checking account, before a business or merchant accepts a check as payment and before a financial institution negotiates the check. The database is generated by tracking checks received for processing, rather than by information received from the banks or financial institutions. Such a database would significantly reduce both financial institution and business losses from returned and unpaid checks.

The invention described herein outlines a methodology and a system construction for establishing a comprehensive database of checking accounts. The database contains records of checking accounts, at both financial institutions that contribute data and those that do not, that are known to be "in good standing" and those accounts that are either closed or designated "not in good standing".

SUMMARY OF THE INVENTION

Generally speaking, the present invention is directed to a method and system for verifying and authenticating negotiable checks drawn on any account from any financial institution based on stored information on whether or not checks drawn on that account in the past have cleared and were paid. More specifically, the invention herein is a method and system for creating and maintaining a database comprising data representative of known accounts which are "in good standing", and data representative of accounts known to be "not in good standing" or closed accounts.

While banks typically know the status of their own customers' checking accounts, they do not keep records of whether checks drawn on accounts at other banks were paid or returned. Furthermore, large businesses that accept many checks may not be able to efficiently track bad accounts. The present method and system differentiates itself significantly from conventional check acceptance databases by not requiring either the check writer's bank or any other business to submit account data. Rather, a financial institution or other business operating the method and system of the invention collects data from all of the checks it receives from its depositors or customers for payment or processing.

Although the system of the invention can be used by a single financial institution or large company, it becomes even more powerful and can advantageously be used by a group of subscribing financial institutions and other companies as well. The greater the number of financial institutions and companies participating in such a system, the greater the number of checking accounts that will be included in the database, because each time a check is deposited for payment or processing to any participating financial institution or submitted to the large company, data on that account may be collected.

Additional data records can come from any subscribing financial institution which process checks for itself or on behalf of other businesses, for example, checks used to pay credit card bills, mortgages, insurance bills and etc. Also, each participating financial institution may directly add its own accounts to the database, and may optionally maintain an update of the account status. Large companies may also participate in the system independently of whether their financial institutions participate.

The information about whether a checking account is in good standing, or is not in good standing can be used by the financial institution or by merchants or other third party providers accessing the system to determine in real time if they should accept a check as payment, by querying the database. Thus, the merchant can mitigate the risk of loss that the check will be unpaid by checking to see that the checking account being drawn upon is known to be active (at least as of the last record update date) and preferably, in good standing.

Advantageously, this invention provides for a database of information about checking accounts residing in banks that do not expressly consent to allowing the use of this information.

Therefore, it is an object of the invention to provide a method and system for determining whether a check is good using a comprehensive database including data representative of all active checking accounts, including an indication of whether each account is in good standing.

It is another object of the invention to provide a method and system for determining whether a check is good using a comprehensive database including data representative of all checking accounts that are not in good standing or are closed.

It is a further object of the invention to develop and maintain such a database without the need for any bank or other financial institution to provide information about their own checking accounts.

It is still another object of the invention to allow a business to verify in real time that a check presented as payment for goods and services is from a known active account, that is in good standing.

It is still a further object of the invention to maintain current data representative of every checking account in the database by tracking the results of the negotiation of each check presented for payment by subscribing financial institutions.

It is yet another object of the invention to collect checking account information about checking accounts residing in banks that do not expressly consent to allowing the use of this information.

It is yet a further object of the invention to collect checking account information including the checking account holder's name and address, along with the checking account number, from the checks received for payment or processing.

Still other objects and advantages of the invention will in part be obvious and will in part be apparent from the specification.

The invention accordingly comprises the several steps and the relation of one or more of such steps with respect to each of the others, and the system embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a filler understanding of the invention, reference is had to the following description taken in connection with the accompanying drawings in which.

DETAILED DESCRIPTION OF PREFERRED EMBODIMENTS

At the heart of the system and method of the present invention is a database of active account information representative of known checking accounts. The database can be used by merchants and other businesses to ascertain whether a check being offered as payment is known to be active and preferably in good standing. In a preferred embodiment of the invention, the database of the system comprises either a single table of active account information, or two related tables, one of active account information and one of accounts that are not in good standing.

A table of known active accounts at any bank is developed by the financial institution operating the system as it accepts and/or processes checks deposited by its customers for payment in the ordinary course of business. An electronic record of each check deposited for payment, including the transit ABA number and account number and the date the check is deposited, is stored in the Active Account table and an "active" status indicator is set.

Depending upon the particular financial institution presenting the check and the particular bank from which funds will be drawn, the financial institution presenting the check can estimate the number of days it will take to be notified that the check is being returned unpaid by the paying bank. Thus, in addition to the record containing the day the check was deposited, the record will contain an estimate of the number of days it will take to return that check. Once that number of days has passed, and the paying bank has not returned the check, the record status can be updated to show that the account is "in good standing", i.e., checks are being paid against that account. Additionally, if other financial institutions and large companies who participate in the system contribute records of their own check processing activities to a central database, a fairly complete table of active checking accounts can be easily developed. Notably, this database is generated from checks presented for payment or processing and without any financial institution having to contribute information about its own checking accounts it maintains.

Similarly, in an alternative embodiment of the invention, a separate table is maintained in the database of accounts at any bank that are not in good standing. Approximately 1% of all checks negotiated are returned by the paying bank because the underlying account has insufficient funds, or the check drafter's signature is irregular, or the account is assigned, blocked or closed. For each check that is returned by the paying bank, the financial institution operating the system of the invention generates an electronic record of the account number (transit ABA) in a table designating accounts that are not in good standing. By aggregating these electronic records, the financial institution can develop a table of accounts from any bank that are not in good standing. Again, as more financial institutions and large companies participate in the service, the resulting database will become more inclusive.

In the normal course of business, accounts may change their status frequently. For example, many accounts that are in the "not in good standing" category change their status to "in good standing". Also, a small percentage of accounts in the "in good standing" category change their status to "not in good standing". In order to maintain current information in the two database tables, information must be passed between them. For example, for each new entry in the table of "not in good standing" accounts, a corresponding record in the table of active accounts must be updated to show a status of "not in good standing" or, such record may be deleted. Also, if the number of prescribed days calculated to receive a returned check has passed and the check has not been returned, then the status of that record in the table of active accounts changes from "active" to "in good standing". Finally, if three years have passed since the last entry of an item for that checking account, that record is preferably deleted.

The table of "not in good standing" accounts is also updated. For each entry in the table of active accounts that changes its status from "active" to "in good standing", any corresponding entry in the table of "not in good standing" accounts is deleted. Additionally, if three years have passed since the last time a check was returned on this account, the record of that account in the table of "not in good standing" accounts may be deleted.

Certain individual features of a preferred embodiment of the invention will now be described.

Developing a database of active accounts at all financial institutions:

In the normal course of doing business, a financial institution accepts and/or processes checks drawn on other financial institutions throughout the United States and to a lesser extent, throughout the world. During its daily processing of checks, financial institutions or third party service providers create electronic records of all of the checks presented that day. Typically, those records are used for posting the checks to accounts, processing returned items and preparing cash letters.

The method and system according to the present invention involves having a financial institution or third party service provider aggregate the daily records. If multiple financial institutions participate, they preferably combine their aggregated records. The record for each account preferably includes the date the account was first entered in the database, the most recent date a check was negotiated and the dates the status of the account changed to "not in good standing".

Eventually, the resulting aggregated database would desirably contain every account number in use at every financial institution in the United States and those countries that conform to the ANSI MICR check standards.

Depending upon the particular financial institution accepting the check and the ABA Transit number and account number on the check negotiated, the number of days it will take to be notified that a check is being returned is predictable. The record for each check in the database contains the day the check was negotiated and an estimate of the number of days it will take to return that check. After the number of days has passed, and the paying financial institution has not returned the check, the file is updated to show that not only is the account "active" but it is "in good standing" and checks are being paid against the account.

Importantly, the database includes accounts at all financial institutions irrespective of whether that financial institution contributed any data.

Developing a table of accounts that are not in good standing:

Each day, a financial institution or third party processor receives checks back for which the paying financial institution has refused payment. A participating financial institution creates an electronic record of the account numbers of these returned checks. By aggregating these records daily, the financial institution has a table of all of the accounts that are not in good standing throughout the United States. If multiple financial institutions participate, the resulting database is more inclusive. Each entry is updated to reflect the most recent date.

Keeping the table of active accounts up to date:

For each new entry in the table of "not in good standing" accounts, the status in the table of active accounts is changed for this account to show a status of "not in good standing".

If the indicated number of days to receive a returned check has passed and the check hasn't been returned, the status of the account is changed from "active" to "in good standing".

Optionally, if three years have passed since the last entry of an item, the entry is deleted.

Keeping the table of "not in good standing" accounts up to date:

For each entry in the table of active accounts that changes its status to "in good standing", the table of "not in good standing" accounts is checked to see if there is a record. If there is, the record is preferably removed.

Optionally, if three years have passed since the last time a check was returned on this account, the entry or record is preferably removed.

Other sources of data:

In addition to checks which a financial institution processes during its normal processing operations, there are typically other sources of checks in other business lines that the method and system according to the present invention can use. For example, checks used to pay credit card bills, mortgages, insurance bills, etc.

Also, it is desirable that large companies and public utilities that receive many checks as payment participate in the method and system according to the present invention.

Furthermore, it is desirable that each participating financial institution add its own accounts to the database, although this is not necessary.

It is also desirable that processing associations, such as check clearinghouses also supply data.

Account numbers also appear on ACH (Automated Clearing House) transactions. As an originating depositary financial institution (ODFI), these transactions and the return of these transactions pass through the financial institution and preferably are added to the database. ACH processors may also be potential sources of data.

How a financial institution can use the database:

Deposits—The financial institution may use the information in the database to decide whether to place a delay on a deposited check or to place an extended delay as allowed by Federal Reserve Board Regulation CC.

Check cashing—The financial institution may use the information in the database to decide if it will cash a check drawn on another financial institution.

Payments—The financial institution may use the information in the database to decide whether it should immediately increase the available credit following a payment to a credit card or line of credit.

Merchant—The financial institution may provide the information in the database to merchants or third party service providers to help merchants decide if they should accept a check from a purchaser.

Additional preferred embodiments of the present invention will now be described.

As described above, in one embodiment of the present invention, a single database table is used to store information concerning checking accounts. Merchants and other businesses deposit checks to their own banks. The bank depositors present the checks to the paying banks, i.e., the banks from which the checks are drawn, and expect to receive payment. The paying banks either pay the checks or return them unpaid. If the checks are paid, the depository banks credit the account of the merchants or businesses that deposited the checks.

Figure 1A:
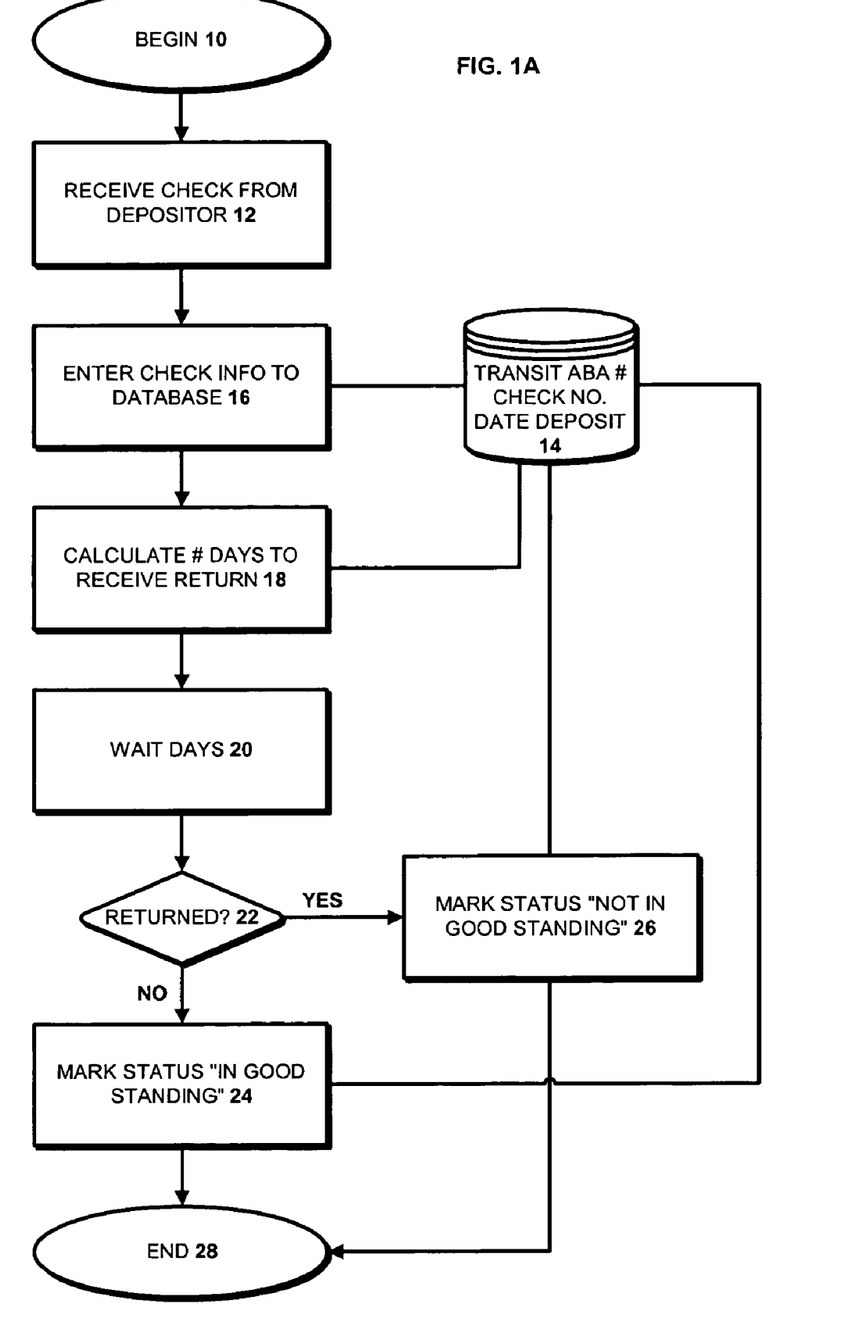
FIG. 1A is a flowchart depicting the steps for generating an Active Account database of checking account information in accordance with one embodiment of the method of the invention.

With reference to FIG. 1A, the financial institution or large company running the inventive system and method begins developing the database of the invention at a step 10 and receives a check from a depositor at a step 12. The financial institution or large company enters the check information into a database 14 at a step 16. Database 14 typically includes the transit ABA number, the account number, the check number and the date of deposit for that check.

Next, at a step 18, the system will calculate the number of days measured from the date of deposit it takes for a returned check to be received from the paying bank. It should be understood that the number of days to receive a returned check is predictable and is dependent on the particular paying bank and the particular depository bank.

The initial entry of check information in database 14 (step 16) involves a status indicator of "active." An active indicator on a data record simply means that a check having that account number has been entered into the system.

For each individual data record, the system waits the number of days calculated in step 18 (step 20). After the calculated number of days has passed, the system determines whether the check has been returned by the paying bank at a decision step 22, and if the check has not been returned, the system marks the status of the record "in good standing" at a step 24. A status indicator of "in good standing" means that recent checks from this checking account have been paid by the paying bank. Thus, if a business or merchant that is trying to determine whether or not to accept a check for payment finds that checks for that checking account have been paid recently, this is a good indication that the check being offered will also be paid.

If, on the other hand, the check has been returned at decision step 22, i.e., has not been paid by the paying bank, the system will mark the status of that record "not in good standing" at a step 26. A status indicator of "not in good standing" means that checks are not being paid on this account at this time. Thus, if a merchant or business is trying to determine whether or not to accept a check from this account for payment, that business or merchant has information that the check may not be paid and can insist on an alternative form of payment.

After marking the status "in good standing" at step 24 or "not in good standing" at step 26, the method of generating the database is ended at a step 28.

It is typical for a financial institution that is acting as a depository to process the deposited checks and returned checks separately as batch processes. In this case, it may be desirable for the system and method of the present invention to contain two separate tables, rather than one. In such a case, one table tracks active accounts as checks are deposited and the other table tracks accounts that are not in good standing.

Figure 1B:
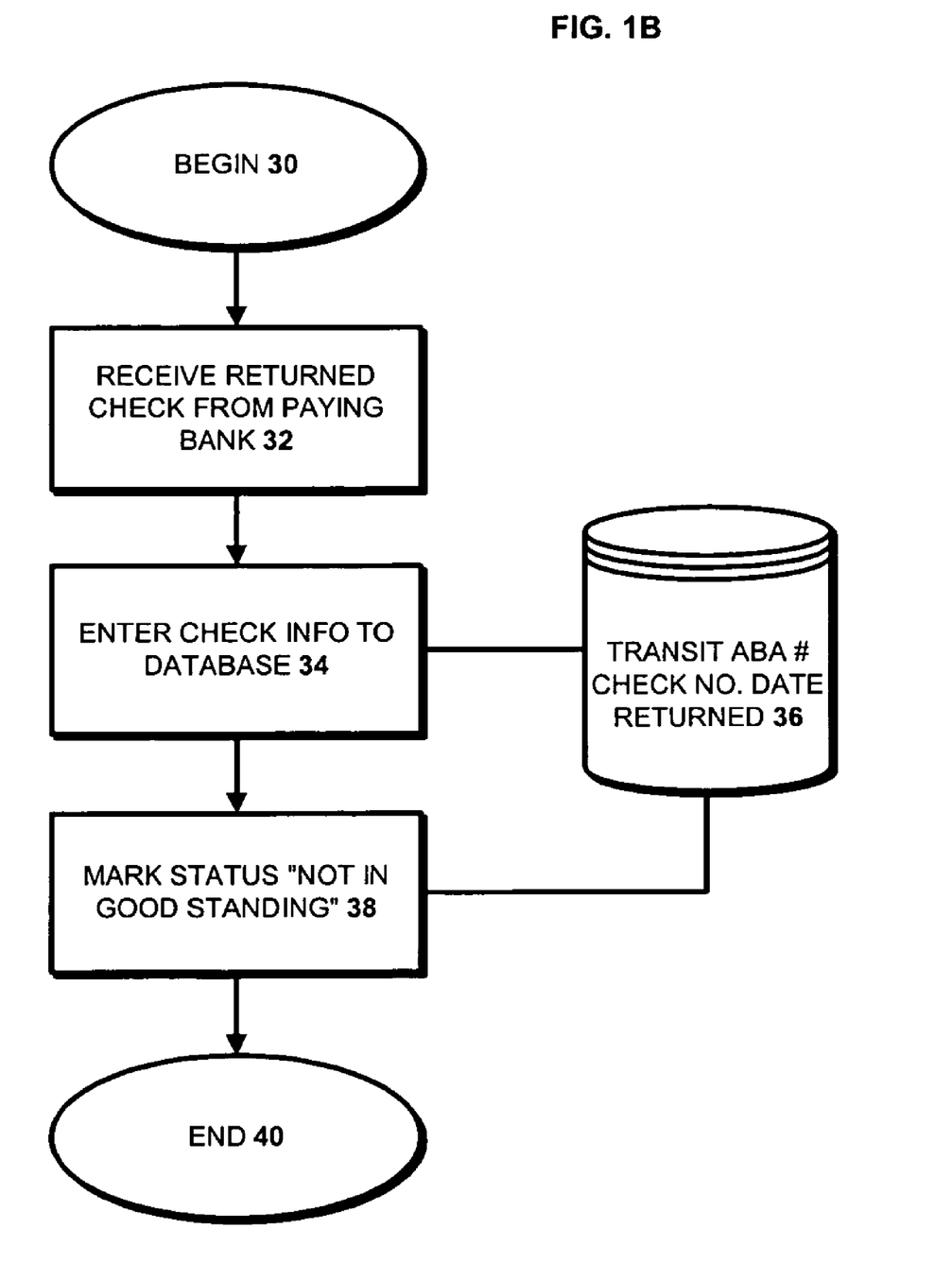
FIG. 1B is a flowchart depicting the steps of generating a Not in Good Standing database of checking account information in accordance with another embodiment of the method of the invention.

With reference to FIG. 1B, the method of generating a table of "not in good standing" accounts begins at a step 30. The financial institution receives returned checks from the paying banks at a step 32. The check information is entered into a second database 36 at a step 34. Desirably, second database 36 will include the transit ABA number, the account number, the check number and the date the check was returned.

Optionally, the system will mark the status of that checking account "not in good standing" at a step 38, and then end at a step 40.

Figure 2A:
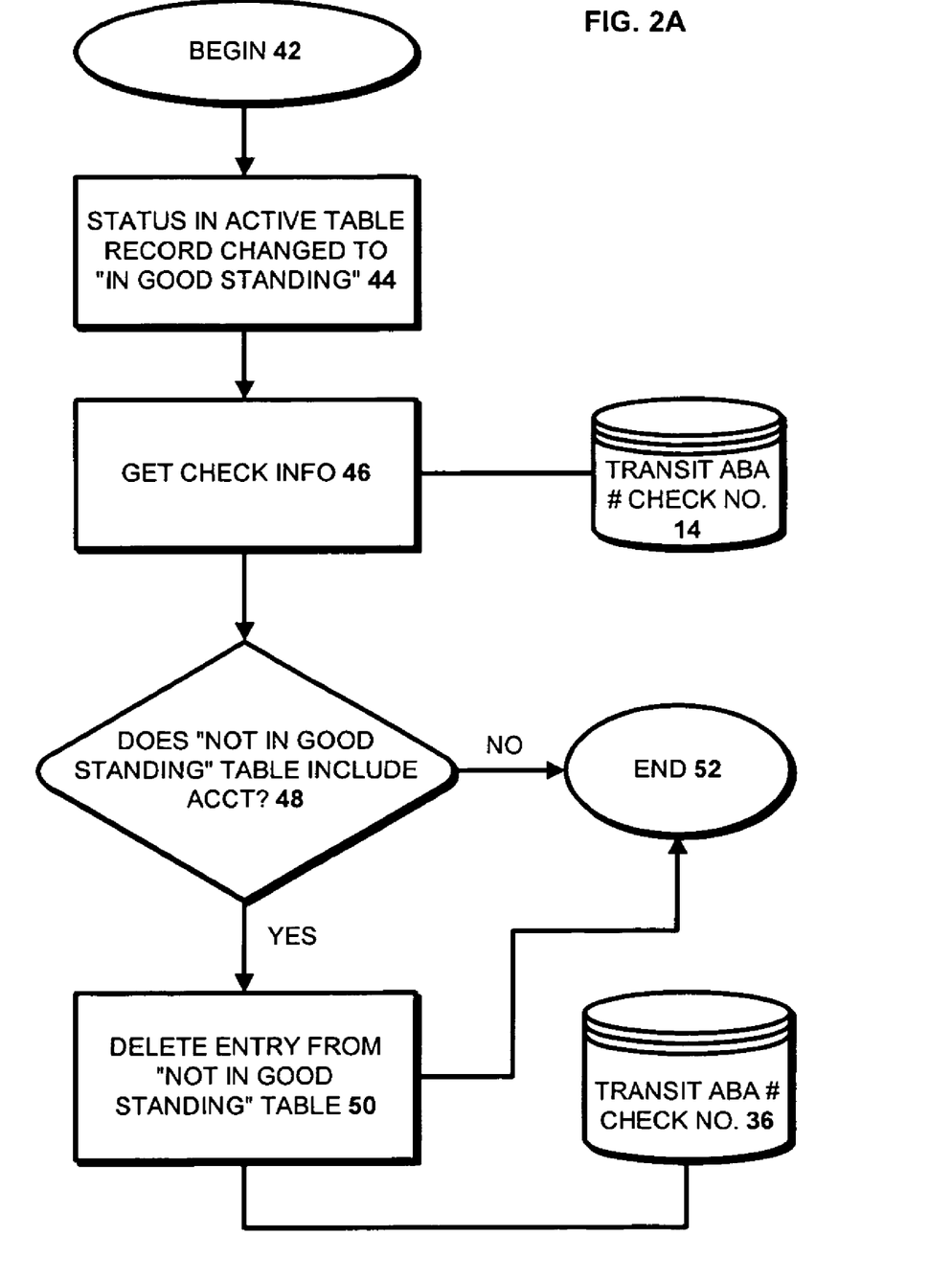
FIG. 2A is a flowchart depicting the steps of updating a Not in Good Standing database of checking account information in accordance with yet another embodiment of the method of the invention.

Now with reference to FIG. 2A, the system reconciles information in each of database 14 and second database 36 and updates them as necessary. The method of updating the table of "not in good standing" accounts begins at a step 42. The system waits until the status of an active account record is changed to "in good standing" at a step 44. The system obtains the check information from database 14 at a step 46 and determines if that record exists in the table of "not in good standing" accounts at a decision step 48.

If the account does not exist in the table of "not in good standing" accounts, i.e., decision step 48 is "no," the method ends at a step 52. On the other hand, if the record does exist, i.e., decision step 48 is "yes," the system deletes the entry from the second database table of "not in good standing" accounts 36 at a step 50, and then the process ends at step 52.

Figure 2B:
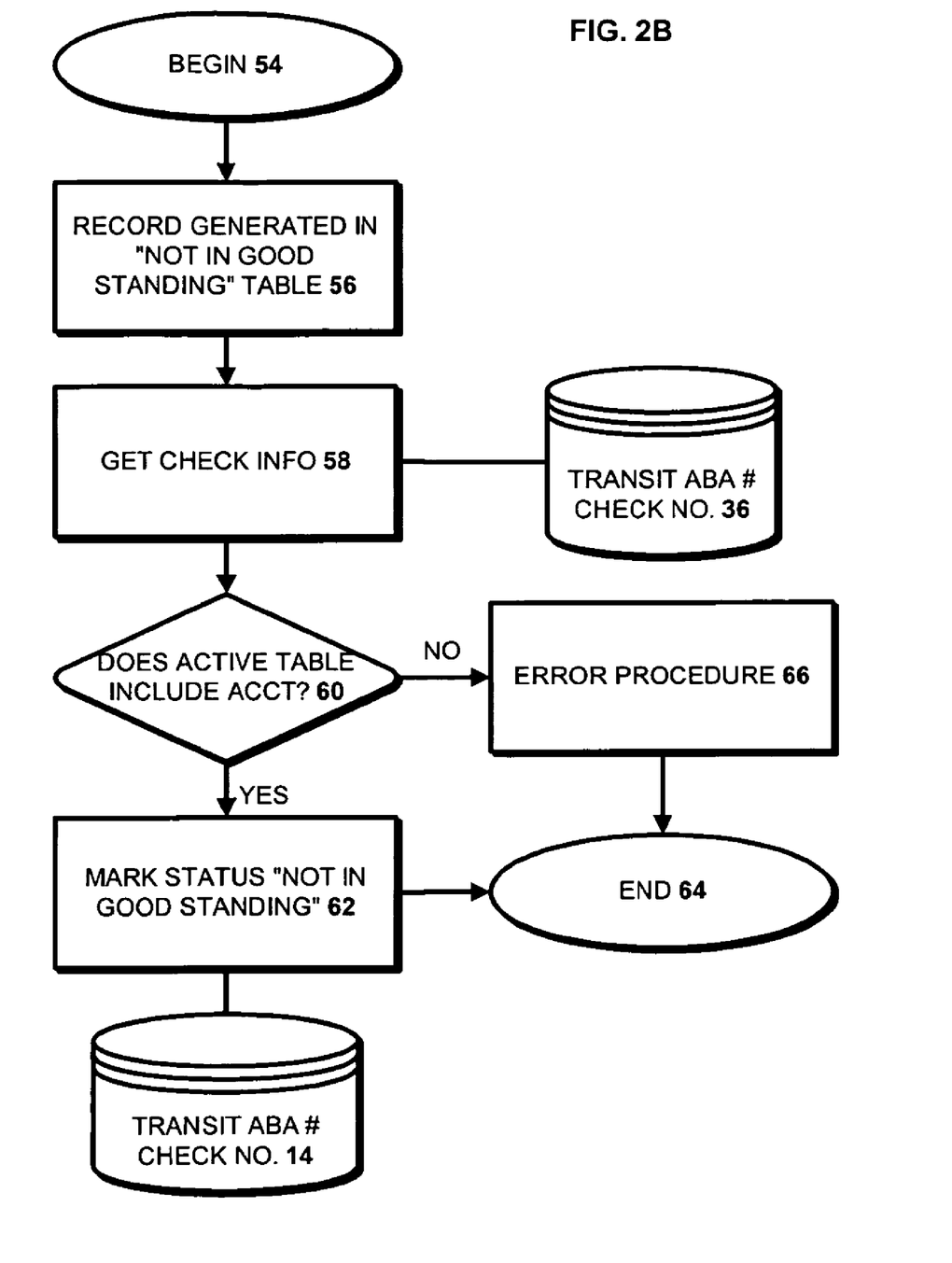
FIG. 2B is a flowchart depicting the steps of updating an Active Account database of checking account information in accordance with still another embodiment of the method of the invention.

Now turning to FIG. 2B, the method of updating the table of active accounts begins at a step 54. The system waits until a new record is generated in second database 36 at a step 56. The system then obtains the check information from second database 36 at a step 58 and determines whether the table of active accounts includes a record of that account at a decision step 60.

If the table of active accounts does include this account, i.e., decision step 60 is "yes," the system marks the status in database 14 "not in good standing" at a step 62 and then ends at a step 64.

On the other hand, if the table of active accounts does not include that account, i.e., decision step 60 is "no," the system performs an error procedure at a step 66 before it ends at step 64. Error procedure step 66 can be used to determine why the check was not already entered in the table of active accounts before it was presented for payment. Since the system and method requires that every check deposited by a business or merchant is entered into the table of active accounts prior to it being presented to the paying bank for payment, each check that is returned should already have an entry in database 14. Thus, error procedure 66 can be used to identify whether the check was improperly returned to the operator of the inventive system or where the system and method is not operating properly.

The present invention provides a system and method for accumulating databases of information concerning checks presented for payment or processing. It will be readily understood that such information can further include the name and address of the checking account holder, which can be determined by inspecting the check. In all cases, the check contains the check writer's name, his or her bank's routing/transit number, his or her account number and his or her signature. Typically, the check will also contain his or her mailing address. Thus, the system operator can easily create databases of these names, addresses, bank and account numbers and signatures.

For entities using systems which capture the image of the checks they are processing, the name, address, bank routing/transit number and account number can be captured using readily available software (e.g., optical character recognition software and the like) to translate this information, which appears graphically on the captured image, into standard alphanumeric characters. These alphanumeric characters can be stored in the databases. The signature (or a derived set of parameters describing the signature) can also be stored graphically (the signature) or alphanumerically (the derived parameters). For system operators that do not use image capture during processing, the alphanumeric information can be entered manually.

This collected data can be used, for example, as follows:
a. validation of information provided by an individual when he or she opens an account or applies for a loan;
b. validation of information provided by an individual when purchasing goods over the telephone or Internet;
c. locating individuals for collections purposes, especially in the environment where a merchant returned a check used to purchase goods at the Point of Sale, in truncation process such as that authorized under the National Automated Clearing House Operating Rules and the merchant no longer has the customer's name and address;
d. to identify potential customers of other banks meeting a particular behavioral profile;
e. to identify potential customers or for purposes of creating a direct marketing mailing list;
f. retrieval and/or validation of a signature on a check, application, document, and the like; and
g. validating checks tendered for payment.

It will thus be seen that the objects set forth above, among those made apparent from the preceding description, are efficiently attained and, since certain changes may be made in carrying out the above methods and in the systems as set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features the invention herein described and all statements of the scope of the invention which, as a matter of language, might be said to fall therebetween.

What is claimed is:

1. A method for determining whether or not a tendered check is negotiable, comprising the steps of:
   storing in a database information concerning checking accounts extracted from checks presented for negotiation including a first table of checking accounts that are not in good standing and a second table of checking accounts that are in good standing;
   receiving checking account information extracted from a tendered check;
   comparing said checking account information from said tendered check to said first table of checking accounts that are not in good standing and said second table of checking accounts that are in good standing;
   returning an indication that said tendered check cannot be verified if said checking account information from said tendered check matches said first table of checking accounts that are not in good standing;
   returning an indication that said tendered check can be verified if said checking account information from said tendered check matches said second table of checking accounts that are in good standing;
   presenting said tendered check for negotiation if said indication that said tendered check can be verified is returned;
   adding a record of said checking account information from said tendered check to said second table of checking accounts that are in good standing and designating said record as active;
   calculating a number of days in which said tendered check would be returned as unpaid and entering said number of days into said record;
   changing said record from active to in good standing if said number of days have passed since said tendered check was presented for negotiation and said tendered check has not been returned as unpaid;
   removing said checking account information from said tendered check from said first table of checking accounts that are not in good standing if said first table includes a record of said checking account information from said tendered check, said number of days have passed since said tendered check was presented for negotiation and said tendered check has not been returned as unpaid;
   deleting said record from said second table of checking accounts that are in good standing if said tendered check has been returned as unpaid; and
   adding a record of said checking account information from said tendered check to said first table of checking accounts that are not in good standing if said tendered check has been returned as unpaid.

2. The method of claim 1, wherein said step of calculating includes determining the particular financial institution presenting said tendered check for payment and the particular bank from which funds will be drawn.

3. A system for determining whether or not a tendered check is negotiable, comprising a database of checking account information including a first table of checking accounts that are not in good standing and a second table of checking accounts that are in good standing; means for receiving checking account information extracted from a tendered check; a processor for comparing said checking account information from said tendered check to said first table of checking accounts that are not in good standing and said second table of checking accounts that are in good standing; means for returning an indication that said tendered check cannot be verified if said checking account information from said tendered check matches said first table of checking accounts that are not in good standing; means for returning an indication that said tendered check can be verified if said checking account information from said tendered check matches said second table of checking accounts that are in good standing; means for presenting said tendered check for negotiation if said indication that said tendered check can be verified is returned; means for adding a record of said checking account information from said tendered check to said second table of checking accounts that are in good standing and designating said record as active; means for calculating a number of days in which said tendered check would be returned as unpaid and entering said number of days into said record; means for changing said record from active to in good standing if said number of days have passed since said tendered check was presented for negotiation and said check has not been returned as unpaid; means for removing said checking account information from said tendered check from said first table of checking accounts that are not in good standing if said first table includes a record of said checking account information from said tendered check, said number of days have passed since said tendered check was presented for negotiation and said tendered check has not been returned as unpaid; means for deleting said record from said second table of checking accounts that are in good standing if said tendered check has been returned as unpaid; and means for adding a record of said checking account information from said tendered check to said first table of checking accounts that are not in good standing if said tendered check has been returned as unpaid.

4. The system of claim 3, wherein said means for calculating includes means for determining the particular financial institution presenting said tendered check for payment and the particular bank from which funds will be drawn.

* * * * *